Patented Sept. 6, 1932

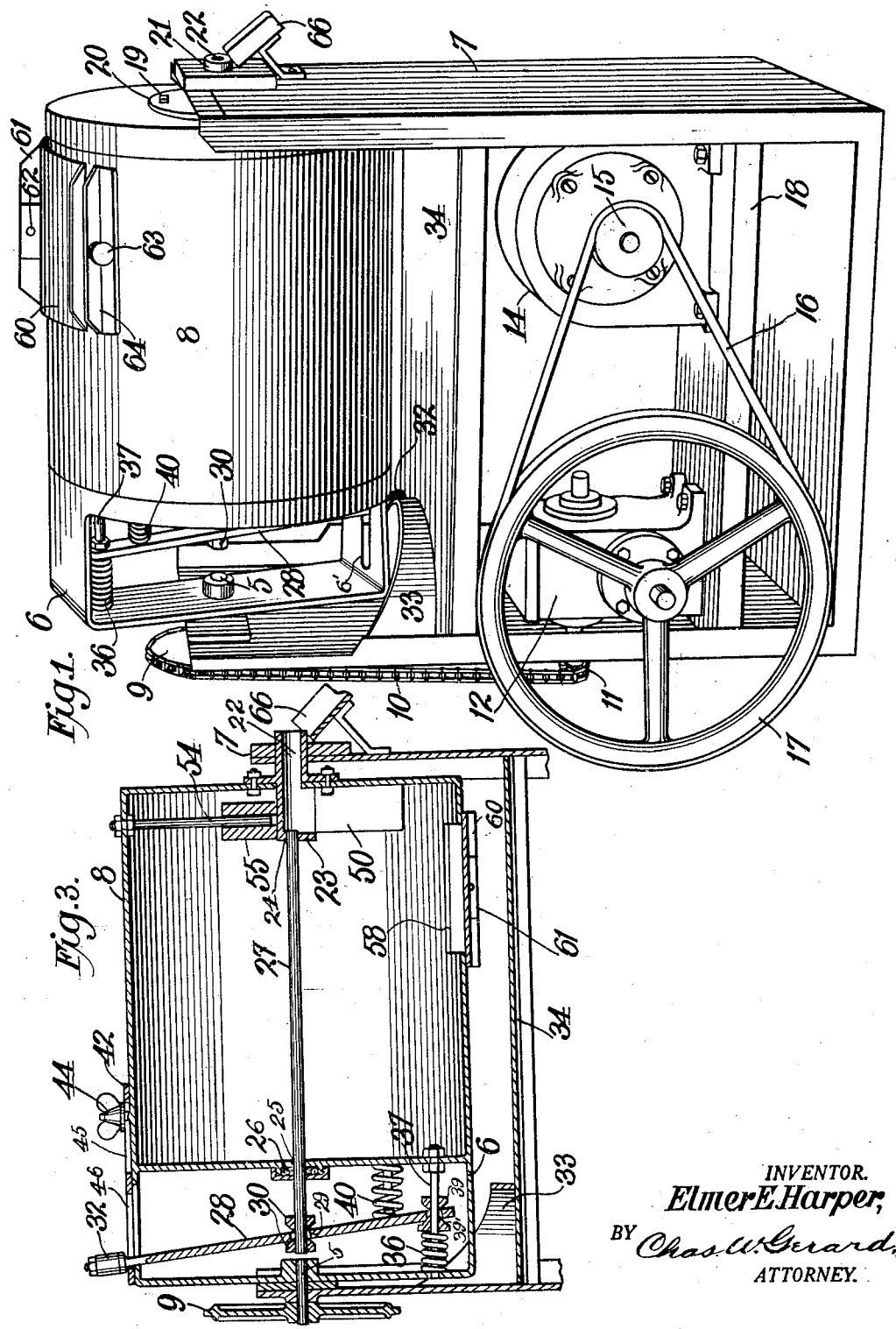

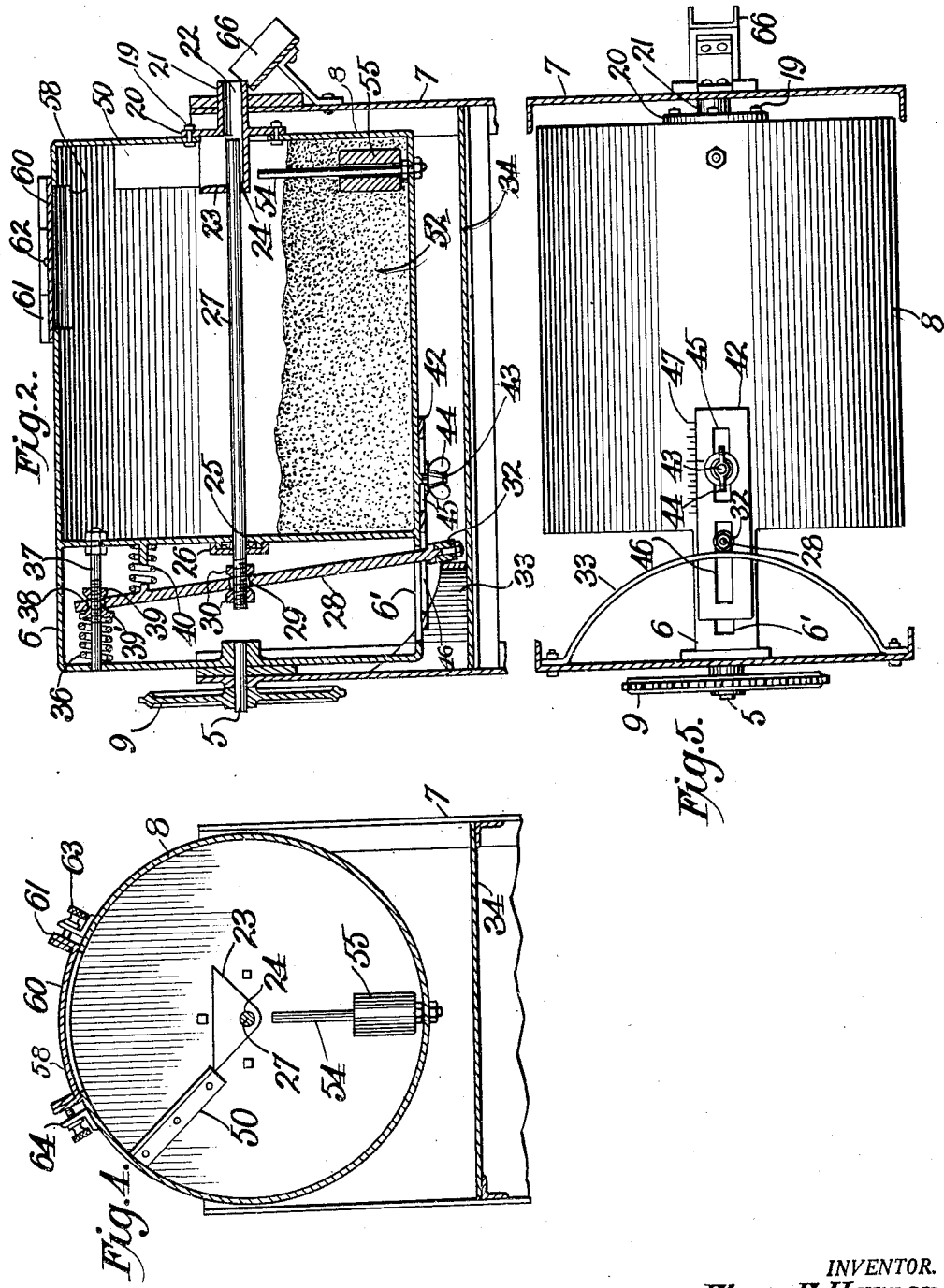
Sept. 6, 1932.  E. E. HARPER  1,875,450
MATERIAL MIXING, FEEDING, AND MEASURING APPARATUS
Filed Dec. 8, 1930  2 Sheets-Sheet 2
INVENTOR.
Elmer E. Harper,
BY Chas. W. Gerard.
ATTORNEY.

1,875,450

UNITED STATES PATENT OFFICE

ELMER E. HARPER, OF KANSAS CITY, MISSOURI

MATERIAL MIXING, FEEDING, AND MEASURING APPARATUS

Application filed December 8, 1930. Serial No. 500,965.

This invention relates to apparatus for handling material, such as dry chemical materials where these are required to be mixed and fed or dispensed in regular, definite quantities, as, for example, in the handling of chemicals for water purification and softening plants. The primary object of the invention, therefore, is to provide an improved apparatus for the continuous mixing, agitating, measuring and feeding in any desired amounts such pulverized or granular materials as hydrated lime, soda ash, alum, pigments, etc., according to the requirements of plants of the character indicated.

Another important object of the invention is to provide apparatus for the handling and measuring of comparatively dry materials by a volumetric method which is not influenced by varying heads of the material above the point of measurement or the discharge level, thereby eliminating any error factors resulting from varying densities in the material which would necessarily attend such variation in the pressure head.

The invention further comprises an apparatus which is not only suitable for the handling, mixing and measuring of two or more materials, but which will also maintain the same in a comparatively loose and readily handled and feedable condition by breaking up lumpy portions and further pulverizing the larger particles of the material by the mixing and agitating action of the machine.

In this connection, it is also a purpose of the invention to provide an apparatus in which its functions are carried out without any undue exposure of the material to the air, thereby preventing any objectionable chemical changes or deterioration in the material from such cause.

With the foregoing general objects in view, as well as various minor objects which will appear in the course of the detailed specification, the invention will now be described by reference to the accompanying drawings illustrating a form of construction suitable for the embodiment of my various improvements, after which those features and combinations deemed to be novel will be set forth and claimed.

In the drawings—

Figure 1 is a general perspective view illustrating a complete apparatus constructed in accordance with my invention;

Figure 2 is a vertical sectional view of the upper portion of the same;

Figure 3 is a similar view, but illustrating a different operative position thereof;

Figure 4 is a transverse section through said upper part of the machine; and

Figure 5 is a horizontal sectional view, showing a bottom view of the drum or mixing unit.

In the handling of materials of the character for which the present application is more particularly designed, such as granular or like materials of a more or less powdery consistency, e. g., hydrated lime, soda ash, alum, and the like, difficulty has been experienced in producing accurate measurements of the material in the feeding operation where a continuous supply of the materials is required, in definitely measured quantities. Since most methods used maintain a supply of the materials in fairly large quantities, as in hoppers, bins, drums or other forms of receptacles, from which the materials are measured and fed from the bottom or some point materially below the top surface of the main supply in the receptacle or container, there is certain to result a considerable degree of compacting of the materials due to cohesion in the mass and the pressure exerted at any point by the weight of the material above that point.

This of course results in increased density of the material at all points materially below the level of the top surface of the main supply, and increased mass per unit volume for each measurement taken under such conditions. Since such increased pressure and density conditions are constantly varying in accordance with the varying quantity of the materials in the receptacle, it is obvious that there can be no constancy in the measuring operation, and hence no uniformly accurate measurement of the materials being fed can be obtained by such methods. I therefore propose by my method and apparatus to eliminate such error factor by carrying out each and every measuring operation under a fixed and unvarying head of material, regardless of the amount or quantity of materials in the container, and so handling the material that uniform conditions will prevail with respect to each consecutive measurement, to the end that as even, uniform and constant a discharge rate as possible may be obtained from a fixed discharge orifice which is provided for the delivery of the materials from the machine.

Referring now to the drawings in detail, these illustrate the improved apparatus as comprising a suitable supporting framework 7 the top of which is provided with bearings for suitably journaling a drum or cylinder 8 for rotating movement about a horizontal axis. One end of the drum is provided with a cage-like extension 6 supported by a short shaft 5 carrying a sprocket wheel 9 driven by a sprocket chain 10 from a drive sprocket 11 forming part of a suitable speed reducing unit 12, which in turn is operated from a suitable motor 14, the pulley 15 of which is connected by a drive belt 16 with the pulley 17 of the speed reducing unit 12, as illustrated in Figure 1. This unit 12 and the motor 14 may be conveniently mounted upon a shelf 18 in the lower portion of the framework 7.

The discharge end of the drum 8 is provided with a combination trunnion and cup and measuring chamber, as shown in Figures 2 and 3, this structure comprising a disk 20 secured over an opening in the corresponding head of the drum, a hollow trunnion portion 21 the interior of which forms an outlet chamber and discharge orifice 22 in alinement with the drum axis, and a cup portion 23 of suitable size projecting inside the drum and provided with a plunger rod opening 24 in alinement with the chamber 22. This opening 24 and an opening 25 surrounded by a packing structure 26 in the opposite head of the drum provide alined bearing guides for the operation of a plunger rod 27 by means of an oscillating lever arm 28, the midportion of which is formed with an opening 29 of suitable size for rocking engagement with the outer end of the rod 27, to which it is secured by spaced convex nuts 30. One end of the lever arm 28 carries a cam roller 32 for operative engagement with a cam member 33 mounted over one end of a shelf 34 below the drum 8. The lever arm is maintained with its roller 32 in engagement with the cam 33 by means of a coil spring 36 mounted on a retaining pin 37 in the opposite side of the cage 6, a washer 39' being interposed between one side of the lever and the spring 36, and a nut 39 adjustably threaded on the pin 37 serving as a limiting stop for this end of the lever, which is provided with an opening 38 for said pin, of sufficient size to permit rocking movement of the lever. Thus a yielding fulcrum is provided for this end of the lever, sufficient to withstand any ordinary working thrust, incident to its forward movement as produced by the cam member 33, but at the same time adapted to yield in case any solid lump of material or foreign substance is encountered by the plunger rod, within the cup 23 or chamber 22. Between the bolt 37 and plunger rod, a second coil spring element 40 is interposed between the lever arm and the adjacent head of the drum, the function of which is to retract the plunger rod after each working stroke thereof as produced by the action of the cam member 33.

A device is also provided for conveniently adjusting the length of the working stroke of the plunger rod 27, comprising a plate 42 clamped by means of a screw 43 and wing nut 44 to the exterior of the drum 8, and also formed with an adjusting slot 45 for said screw 43, and a second slot 46 for the adjacent end of the lever arm 28, in register with a slot 6' in the cage frame 6, as clearly shown in Figures 2 and 4. It is apparent that the adjustment of the position of the slot 46 of the plate 42 will limit the backward travel of the lever arm 28, and a suitably graduated scale 47 may be provided along one edge of said plate to serve as a guide in regulating this adjustment.

A flanged plate 50 is secured in radial position to the interior of the head of the drum at its discharge end, in such relation as to act as a scoop for feeding the material 52 into the cup 23 as the drum is rotated (see Figures 2 and 4). Also projecting radially within the drum, and in the direction of the bottom of the cup 23 is secured a pin 54 upon which is fitted a sliding weight 55, adapted to fall by gravity as the pin 54 reaches upright position above the cup, for the purpose of delivering a sharp blow against the bottom of the cup when in inverted position, thereby loosening any clinging material and insuring the complete emptying of the cup after each measuring operation or stroke of the plunger rod 27 (see Figure 3).

The opening 58 through which the material 52 is supplied to the drum is adapted to be closed by means of a tightfitting, but easily removable cover member formed with outturned flanges 61 having threaded openings 62 for engagement with fastening screws 63 carried by angle pieces 64 attached to the outer face of the drum 8 (see Figures 1 and 4).

In the operation of the machine, the drum 8 is partly filled with the material or materials to be handled, the quantity placed in the drum not to exceed more than half the drum's capacity, after which the cover member 60 is secured tightly in position by means of the thumb screws 63. The machine is then started in operation by means of the motor 14, thereby rotating the drum 8 at whatever speed is desired and thoroughly mixing and agitating the material. As the drum rotates, some of the material falls into the cup 23, the filling of which is facilitated by the action of the scoop element 50 as it passes through vertical position over the cup. The cup is thus filled to overflowing, and when in this condition the rotation of the drum causes the operation of the lever arm 28, by engagement with the cam member 33, to actuate the plunger rod 27 toward the right in Figure 2, whereby it forces a measured quantity of the material out of the cup into the discharge chamber 22. As the drum continues to rotate, the plunger rod is returned to initial position, by the action of the spring 40 as the roller 32 at the end of the lever 28 rides back down the other side of cam 33, during which time the cup member 23 is brought into inverted position, as illustrated in Figure 3. At the same time, the rod 54 and weight 55 are also brought directly into position directly over the cup 23, which permits the weight 55 to drop by gravity and deliver a sharp blow upon the bottom of the cup for the purpose of jarring loose any material which may be still clinging to its interior, in order that the cup will be completely emptied before resuming the cycle of operations for the next measuring and feeding operation.

The following rotation of the drum refills the cup 23 in the same manner and likewise produces another forward working stroke of the plunger rod 27 by which the same amount of the material is discharged from the cup into the chamber 23; from this chamber the material is discharged by the succeeding strokes of the plunger delivering new measured charges of the material to said chamber, from which the material is carried to the point of use.

If desired, a suitable chute 66 may be mounted beneath the discharge orifice for receiving the material discharged therefrom, as represented in Figures 1 and 2. As the drum continues rotating, the cup is again emptied, by dumping of the material therefrom and being subjected to another blow from the weight 55, and the further operation of the machine is simply a repetition of the foregoing.

It will be seen that the complete filling and emptying of the cup at each rotation of the drum is one feature of the invention which is of primary importance, for it is by this means that a uniform unvarying head of the material is assured for each measuring operation, to the end that a mass of the material of uniform density will be presented to the action of the end of the plunger rod as this operates to eject the material from the cup into the discharge chamber 22. The amount of the material so measured corresponds to the amount of material removed from the cup 23 by the plunger stroke, substantially equalling in volume the size of that portion of the plunger which enters the cup 23. Hence the rate of measurement and discharge of the material may be varied by using plungers of different sizes, as well as by varying the stroke of the plunger rod, which in the illustrated construction may be conveniently accomplished by adjustment of the plate 42, thereby varying the position of the slot 46 whereby the extent or amplitude of retracting movement of the lever arm 28 may be varied (see Figure 5). Where such changes in the capacity are desired, involving variations in the size of cup 23 and discharge chamber 22, it will be convenient to provide a range of sizes of the combination trunnion 21 and cup member 23, to be replaced by simply unbolting the one in use and reapplying the size desired, as permitted by the removable fastening bolts 19.

It is also apparent that variations in the discharge or feed rate may be obtained by variation of the rate of drive of the machine, and the apparatus is also well adapted for the regulation of the feed by automatic means, if desired, so that the machine may be operated for automatic proportional feed where this is required.

A further advantage of the improved apparatus is the exclusion of circulating air from free access to the interior of the drum, the only air admitted being that required to replace the volume of material as it is discharged, and as such small amount of air is never sufficient to carry enough moisture to cause deterioration or material chemical change in the contents of the drum, it is possible to preserve hygroscopic materials such as hypochlorite of lime, bisulphite of soda and the like for a long period without appreciable deterioration. It may also be noted that the character of the movement imparted to the material within the drum is such as to generate some heat by friction, with drying effect, and if desired it is obvious that further heating and drying effect may be imparted to the material by application of heat from an external source, as by heating units located in close proximity to the shell of the drum, or even installed therein in a well understood manner, without departing from the principle of the invention. The character of the movement of the materials within the drum is furthermore of a nature not only to impart an additional breaking up or pulverizing effect to the larger particles of the material, but also to maintain a substantially homogeneous mixture of all materials within the drum, where two or more different substances are being handled for the purpose of measuring and feeding the same.

This involves a material advantage as regards economy in installations requiring the handling of several different substances which ordinarily necessitate the use of a separate feeder for each material, because the mixing of such materials cannot be successfully accomplished with the usual feeding devices; therefore the operation of a machine as herein described effects a saving in apparatus cost because of its capacity to mix, measure and feed two or more different substances as efficiently as one.

While I have illustrated and described what is now regarded as the preferred mode of practicing the invention, as well as one practical form of construction for facilitating this operation, I desire to reserve the right to make whatever changes or modifications may fairly fall within the scope of the following claims.

What I claim is:

1. Material handling apparatus comprising, in combination with means providing a discharge orifice, a cup adjacent to said orifice, means for effecting the discharge of a measured quantity of material from said cup through said orifice, and means operating to empty and refill said cup between successive operations of said discharging means.

2. Material handling apparatus comprising, in combination with means providing a discharge orifice, a cup communicating with said orifice, a plunger device operating through said cup to eject a measured quantity of material therefrom through said orifice, and means operating to empty and refill said cup between the successive operations of said plunger.

3. Material handling apparatus comprising, in combination with means providing a discharge orifice, a cup adjacent to said orifice, means for effecting the discharge of a measured quantity of material from said cup through said orifice, and means for inverting and refilling said cup between successive operations of said discharging means.

4. Material handling apparatus comprising, in combination with means providing a discharge orifice, a cup adjacent to said orifice, means for effecting the discharge of a measured quantity of material from said cup through said orifice, means for inverting and refilling said cup between successive operations of said discharging means, and means operating automatically to strike a blow upon the cup while in inverted position.

5. Material handling apparatus comprising a receptacle provided with a discharge orifice, a cup mounted within the receptacle adjacent to said orifice, means for effecting the discharge of a measured quantity of material from said cup through said orifice, and means for imparting movement to the receptacle to invert and refill the cup between successive discharging operations.

6. Material handling apparatus comprising a movable receptacle provided with a discharge orifice in line with the axis of movement of the receptacle, a cup mounted within the receptacle in communication with said orifice, means operating intermittently to effect the discharge of a measured quantity of material from the cup through said orifice, and means for imparting movement to the receptacle about its axis to invert and refill the cup between successive discharge operations.

7. Material handling apparatus comprising a rotary receptacle provided with an axial discharge orifice, a cup mounted within the receptacle in communication with said orifice, an axial plunger operating through said cup to discharge a measured quantity of material therefrom through said orifice, and means for rotating the receptacle and thereby inverting and refilling the cup between successive operations of said plunger.

8. Material handling apparatus comprising a rotary receptacle provided with an axial discharge orifice, a cup mounted within the receptacle in communication with said orifice, means for rotating the receptacle and thereby periodically emptying and refilling the cup, and an axial plunger actuated by the movement of the receptacle to eject a measured quantity of material from the cup through said orifice after each emptying and refilling operation.

9. Material handling apparatus comprising a rotary receptacle provided with an axial discharge orifice, a cup mounted within the receptacle in communication with said orifice, means for rotating the receptacle and thereby periodically inverting and refilling the cup, a plunger actuated by movement of the receptacle to eject a measured quantity of material from the cup through said orifice after each emptying and refilling operation, and a weight element actuated by gravity when said cup is in inverted position to strike a blow upon the bottom of the cup.

10. Material handling apparatus comprising a rotary receptacle provided with an axial discharge orifice, a cup mounted within the receptacle in communication with said orifice, a scoop element mounted within the drum in position to direct material through the cup, means operating intermittently to effect the discharge of a measured quantity of the material from the cup through said orifice, and means for rotating said receptacle and thereby emptying and refilling the cup between successive operations of the plunger.

11. Material handling apparatus comprising a rotary receptacle provided with an axial discharge orifice, a cup mounted within the receptacle in communication with said orifice, a plunger operating through said cup to discharge a measured quantity of material therefrom through said orifice, means actuated by the movement of the receptacle to reciprocate said plunger, and adjustable means for restricting the movement of the plunger and varying the operative stroke thereof.

12. Material handling apparatus comprising a rotary receptacle provided with an axial discharge orifice, a cup mounted within the receptacle in communication with said orifice, a plunger operating through said cup to discharge a measured quantity of material therefrom through said orifice, and a yieldingly fulcrumed lever actuated by the movement of the receptacle to reciprocate said plunger.

13. Material handling apparatus comprising a rotary receptacle provided with an axial discharge orifice, an axial plunger operative to discharge material from the receptacle through said orifice, a lever carried by the outer end of said plunger, and a fixed cam engaged by said lever as the receptacle is rotated for reciprocating the plunger.

14. Material handling apparatus comprising a rotary receptacle provided with an axial discharge orifice, an axial plunger operative to discharge material from the receptacle through said orifice, a frame extension carried by one end of the receptacle and provided with a lever connected with the outer end of said plunger, and a fixed cam engaged by said lever as the receptacle is rotated for reciprocating the plunger.

15. Material handling apparatus comprising a rotary receptacle provided with an axial discharge orifice, an axial plunger operative to discharge material from the receptacle through said orifice, a frame extension carried by one end of the receptacle, a lever yieldingly fulcrumed within said extension and connected with the outer end of said plunger, and a fixed cam engaged by said lever as the receptacle is rotated for reciprocating the plunger.

16. Material handling apparatus comprising a rotary receptacle provided with an axial discharge orifice, an axial plunger operative to discharge material from the receptacle through said orifice, a lever carried by the outer end of said plunger, a plate adjustably secured to the outer face of the receptacle and formed with a shoulder for restricting the movement of the lever, and means engaged by said lever as the receptacle is rotated for actuating said lever to reciprocate the plunger.

17. Material handling apparatus comprising a rotary receptacle, a combination trunnion and cup element carried by one end of the receptacle and provided with an axial discharge orifice, and an axial plunger actuated by movement of the receptacle for ejecting material from the cup portion of said element through said discharge orifice.

18. The method of feeding measured quantities of loose comparatively dry material which consists in providing a mass of material adjacent to the feeding point, dipping a sufficient quantity of the material from said mass for maintaining a given head and density of the material at the feeding point, feeding the material by separating a measured quantity thereof and removing the same, and restoring the orginal quantity and head of the material by repeating said dipping operation between successive feeding operations.

19. The method of feeding measured quantities of loose comparatively dry material which consists in providing a mass of material adjacent to the feeding point, transferring a sufficient quantity of the material from said mass to a position directly above the feeding point for maintaining a given head and density of the material at the feeding point, feeding the material by punching a measured quantity therefrom and removing the same, and restoring the original quantity and head of the material by repeating said transferring operation between successive feeding operations.

20. Material handling apparatus comprising, in combination with means providing a discharge orifice and for maintaining a mass of the material adjacent to said orifice, means for intermittently transferring a sufficient quantity of material from said mass to maintain a given head and density of material at said orifice, and means for intermittently separating and forcing a given amount of said material through said discharge orifice.

In witness whereof I hereunto affix my signature.

ELMER E. HARPER.